Jan. 12, 1960 A. Y. DODGE 2,920,721
COMBINED SHOE AND DISC BRAKE
Filed Oct. 19, 1956 2 Sheets-Sheet 2
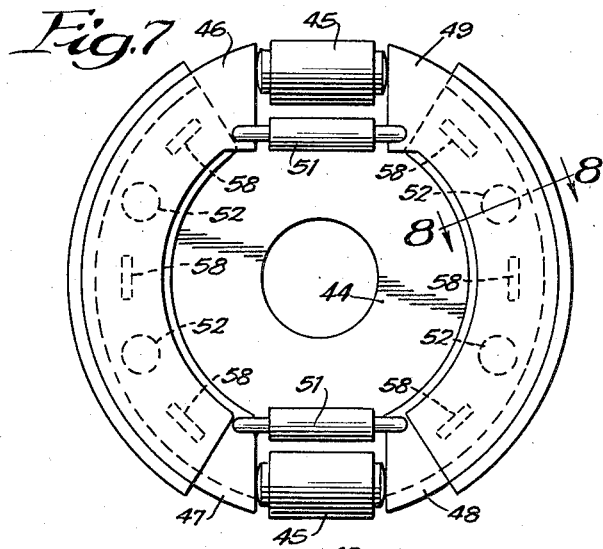
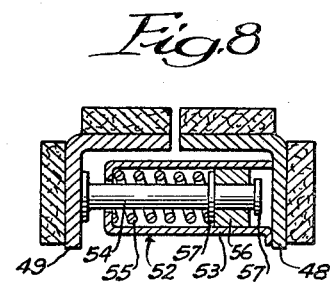
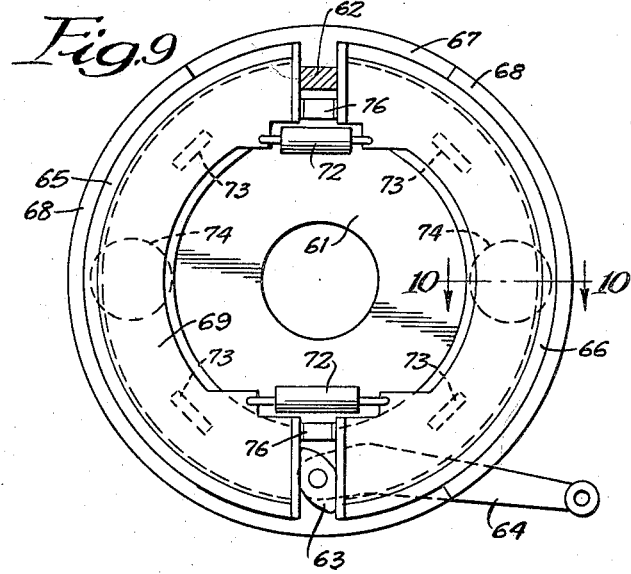
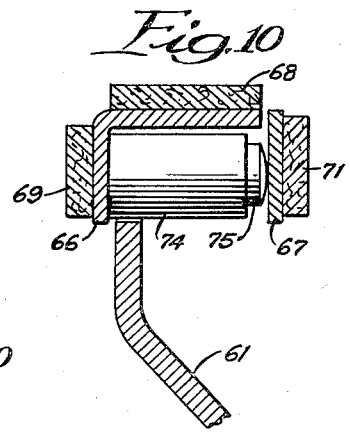
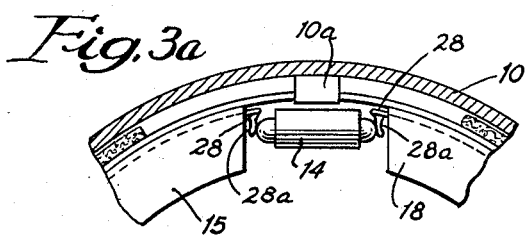
INVENTOR:
Adiel Y. Dodge,
BY Dair, Freeman & Molinare
ATTORNEYS.

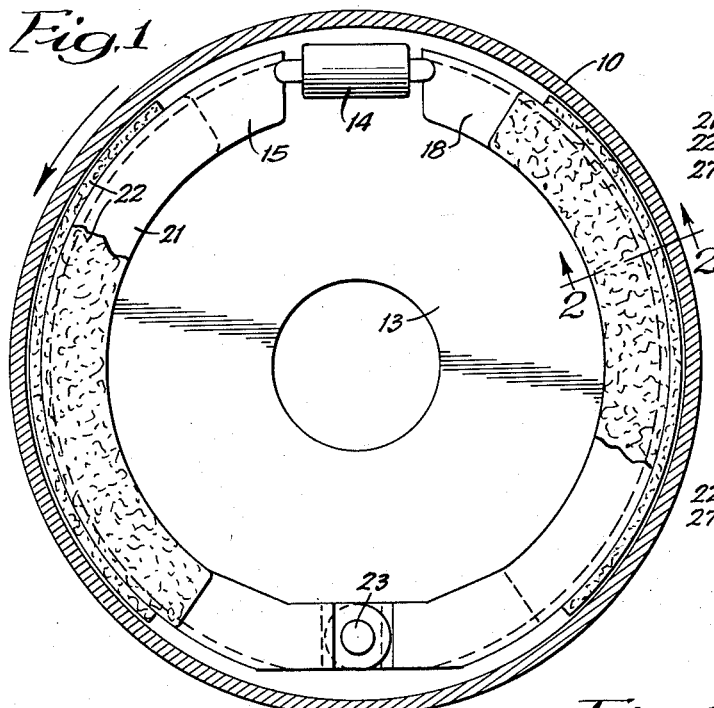
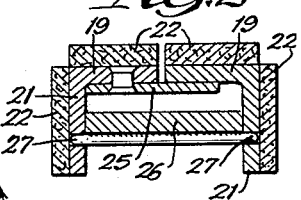
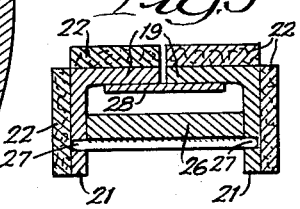
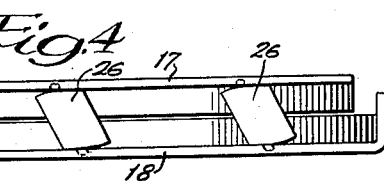
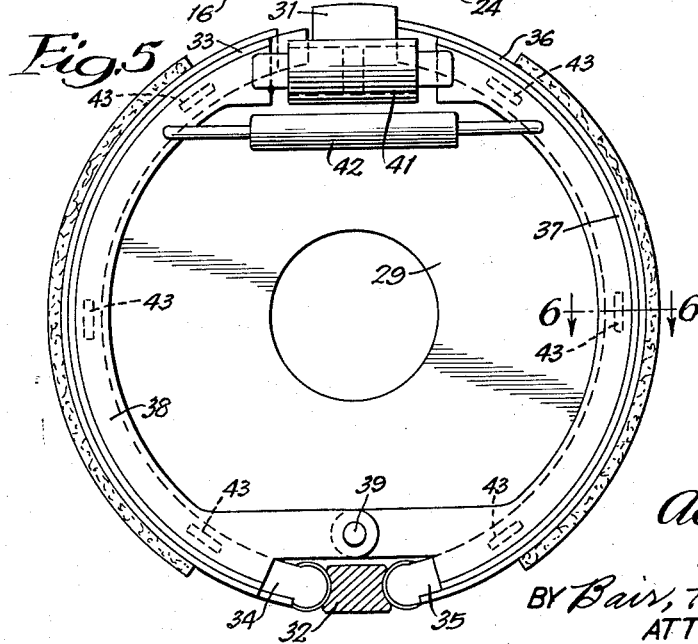
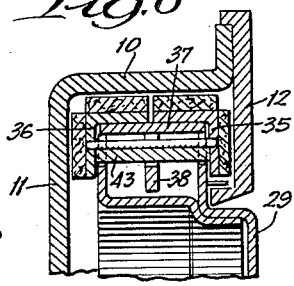

United States Patent Office 2,920,721
Patented Jan. 12, 1960

2,920,721

COMBINED SHOE AND DISC BRAKE

Adiel Y. Dodge, Rockford, Ill.

Application October 19, 1956, Serial No. 616,992

12 Claims. (Cl. 188—70)

This invention relates to a combined shoe and disc brake and more particularly to a vehicle wheel brake including both arcuate shoe and flat disc portions.

Combined shoe and disc brakes have heretofore been proposed, as for example, in my co-pending application, Serial No. 464,121, filed October 22, 1954, in which brake members including both arcuate shoe and flat disc portions engage the arcuate web and flat flange portions respectively of a channel shaped drum. The present invention relates to brakes of the same general type and has for one of its objects the provision of improved cam means which operate substantially without friction to spread the brake members into engagement with the drum, and which are simply and easily mounted.

According to a feature of the invention, the cam means are formed by tiltable cam elements extending axially between the disc portions of the brake members and having eccentrically curved ends to spread the brake members axially upon relative circumferential movement thereof. The cam elements may be formed with projecting lugs at their ends extending into openings in the brake members to support the cam elements and to prevent slipping thereof relative to the brake members.

Another object is to provide a combined shoe and disc brake in which there are a plurality of brake members with one brake member engaging an abutment, one brake member of another pair moved into engagement with the drum by operating means, and a flexible connection between the other brake members of the pairs for transmitting circumferential forces therebetween.

According to a feature of the invention, cams acting between different pairs of the brake members are formed with different angles to equalize the braking pressure on the different members.

According to another feature, all of the brake members are urged radially outward into engagement with the web of the drum by radially expansible operating elements underlying the brake members.

A further object is to provide a combined shoe and disc brake in which brake members are mounted side by side in pairs between spaced abutments on a fixed support and at least one of the abutments includes operating means to move the adjacent brake members circumferentially into engagement with the drum.

A still further object is to provide a brake in which the brake members are spread axially into engagement with the drum by operating means and relative circumferential movement thereof is limited so that the friction drag on one of the brake members exerts an applying force on another of the brake members, whose rotation is limited by engagement with abutments on the support.

In one desirable construction, at least one of the abutments on the support may be in the form of a cam whose angle is adjustable to adjust the brake clearance and which can be employed as a mechanical brake operator.

The above and other objects and features of the invention will be more readily apparent from the following description when read in connection with the accompanying drawings in which:

Figure 1 is an axial section of a brake embodying the invention;

Figure 2 is a section on the line 2—2 of Figure 1;

Figure 3 is a section similar to Figure 2 showing an alternative operating means;

Figure 3a is a partial section similar to Figure 1 illustrating the operating means of Figure 3;

Figure 4 is a developed view of the several brake members of Figure 1;

Figure 5 is a view similar to Figure 1 of an alternative construction;

Figure 6 is a section on the line 6—6 of Figure 5;

Figure 7 is a view similar to Figure 1 of still another alternative construction;

Figure 8 is a section on the line 8—8 of Figure 7;

Figure 9 is a view similar to Figure 1 of a further alternative construction; and Figure 10 is a section on the line 10—10 of Figure 9.

All of the several embodiments of the invention shown are adapted to be used with a channel shaped drum as seen in section in Figure 6. The drum as illustrated includes a cylindrical web portion 10 having an integral flat flange 11 at one side thereof, and closed at its other side by a flat closure plate 12 defining a second flange. The completed drum is of channel section with the channel opening inwardly and with the flat flanges 11 and 12 facing each other and forming disc surfaces. The drum may be attached to the wheel of a vehicle in the usual manner for rotation therewith, and turning of the wheel is resisted by frictional engagement of the brake members as described hereinafter with the drum.

In the embodiment of Figures 1, 2 and 4 there is a fixed support 13, which may be shaped substantially as a disc or may have any other desired configuration, and which lies within the drum. The support carries an operating cylinder 14 which may be in the form of a conventional hydraulic wheel cylinder to spread the brake members circumferentially into engagement with the drum and to act as an abutment to limit rotation of the brake members.

Within the drum four brake members are mounted as shown at 15, 16, 17, and 18, each of which is provided with an arcuate shoe portion 19 as seen in Figure 2 and a flat disc portion 21. The arcuate shoe and flat disc portions carry friction linings 22 which are adapted to engage the inner surfaces of the drum to resist rotation thereof. When the brake members are assembled in the drum, the members 15 and 18 engage the combined operating cylinder and abutment 14 and the other two brake members 16 and 17 are flexibly interconnected through a pivotal joint 23 between extensions 24 thereon.

The brake members are held against relative radial separation by strips 25 as shown in Figure 2 riveted to one of the brake members and extending under the shoe portion 19 of an adjacent brake member so that the brake members will stay in radial alignment at all times.

To operate the brake members axially into engagement with the flange portions of the drum, cam elements are provided as shown in Figures 2 and 4. Each cam element includes a body portion 26 having eccentrically curved ends engaging the flat inner surfaces of the disc portions of the brake members and provided with projecting lugs or spurs 27 extending into openings in the disc portions of the brake members. As shown, the ends of the cam elements are smoothly arcuately curved continuously from side-to-side of the elements to provide a smooth continuous cam action as the cam elements are tilted. The spurs or lugs 27 serve not only to support the cam elements between the brake members, but also prevent any relative slipping between the ends thereof so that the cam members will have a true rolling action against the flat disc portions of the brake members.

In operation of the brake as so far described, assuming that the drum is turning counter-clockwise, as seen in Figure 1, when the operating means 14 is expanded, it will urge the shoe 15 radially outward to bring its arcuate friction surface into engagement with the web 10 of the drum. The shoe 15 therefore tends to turn with the drum and to move circumferentially relative to the shoe 16. This will turn the cams 26 clockwise, as seen in Figure 4, to spread the brake members 15 and 16 axially and to move the flat disc surfaces thereof into engagement with the drum. Tendency of the brake member 16 to turn with the drum is resisted by transmission of circumferential force to the brake member 17, which in turn moves relative to the brake member 18 to tilt the cam element 26 therebetween and to spread the brake members 17 and 18 into engagement with the drum.

Rotation of the brake member 18 is limited by engagement with the combined abutment and operating means 14, so that it tends to spread radially outward into engagement with the web of the drum. It will be seen that the forces acting on the brake members 16 and 17 move them radially into engagement with the web of the drum so that both the arcuate shoe portions and the flat disc portions of all of the brake members are simultaneously effective to brake the drum.

Since the forces acting between the second set of brake members 17 and 18 are the result of the friction drag on both brake members 15 and 16 plus the actuating force of the means 14, the spreading force generated by the cams 26 acting between the brake members 17 and 18 would tend to be greater than the spreading force produced by the cams acting between the brake members 15 and 16. To compensate for this, the cams 26 acting between the brake members 15 and 16 are made to have a smaller effective cam angle than the cams acting between the brake members 17 and 18. I have found, for example, that an effective cam angle of about 26½ degrees between the brake members 15 and 16, and an effective cam angle of about 45 degrees between the brake members 17 and 18 will equalize the braking force on the several brake members. It will be appreciated that counter-clockwise rotation of the drum is assumed to be the forward direction of travel of the vehicle, so that the braking action is utilized for forward braking where the heaviest requirements must be met, and lesser braking action is tolerated in reverse braking.

Figure 3 illustrates a modification of the construction of Figures 1, 2 and 4, wherein parts identical with corresponding parts in Figures 1, 2 and 4 are indicated by the same reference numerals. In this construction all of the elements are the same as shown in Figures 1, 2 and 4 with the exception of the operating means. In the case of Figure 3 the end brake members 15 and 18 engage a fixed abutment 10a on the support, and all of the brake members are simultaneously moved radially outward into engagement with the drum by a flexible operating band 28 lying within the brake members and spread by an operating means such as a hydraulic cylinder 14. As seen in Figure 3a the band 28 has enlargements 28a on its ends engaging the movable plunger elements of the cylinder 14. The operation of this construction will be substantially similar to that described above, except for the differences resulting from the different operating means.

Figures 5 and 6 illustrate another construction including a support 29 having two fixed abutments 31 and 32 thereon at diametrically opposite points. In this construction there are four brake members 33, 34, 35 and 36 arranged in side by side pairs between the abutments. Each of the brake members is of L section with an arcuate shoe portion and a flat disc portion to fit within the channel shaped drum as described above.

The ends of the brake members 34 and 35 engage the abutment 32 as shown, and the ends of the brake members 33 and 36 engage the abutment 31. Brake members 33 and 36 do not engage the abutment 32 nor do brake members 34 or 35 engage the abutment 31, so that relative rotation between the brake members of each pair is possible.

To apply the brakes arcuate beams 37 are provided lying within the brake members as best seen in Figure 6, and having central stiffening flanges 38. The arcuate portions of the beams 37 engage the arcuate shoe portions of the several brake members and there are two beams 37 pivotally interconnected at 39, as seen in Figure 1. The opposite ends of the beams engage a hydraulic cylinder 41 which will spread the beams radially when it is energized and may be connected by a return spring unit 42 to disengage the brake. The spring unit 42 may be constructed in the same manner as the spring unit 52 shown in detail in Figure 8 and still further described and claimed in my Patent No. 2,596,379.

To spread the brake members axially cam members 43 are provided as shown in Figure 6, each acting between the disc portions of the brake members. The cam members 43 may be constructed in the same manner as the cam members 26 of Figures 1 to 4 so that upon relative movement between the brake members, the brake members will be moved axially to engage the flange portions of the drum. It is obvious that circular discs operating on inclined planes would be equivalent to my cams 26 and might be substituted therefor. The inclined planes might be pressed into surfaces 17 and 18, Figure 4, or they might be suitably attached to said surfaces.

In operation of this brake, when the cylinder 41 is energized, it will spread the beams 37 radially to move all of the brake members simultaneously outward into engagement with the web of the drum. Assuming counter-clockwise rotation of the drum, the brake members 34 and 36 will be held against turning by engagement with the abutments 32 and 31 respectively, but the brake members 33 and 35 will tend to turn counter-clockwise with the drum. Relative circumferential movement of the brake members and the operating beams will tilt the cams 43 to spread the brake members axially and bring the disc portions thereof into frictional engagement with the flanges of the drum. Therefore, in this construction the arcuate shoe and flat disc portions of the brake members are moved simultaneously into engagement with the drum, and the cam members will provide a servo action increasing the applying force on the brake members.

Figures 7 and 8 show a further alternative construction including a support 44 carrying a pair of combined operating means and abutments 45 at diametrically spaced points. The operating means 45, as well as the cylinders 14 and 41, may be constructed as more particularly disclosed and claimed in my Patent No. 2,603,952 to provide self adjustment cushioning of the brake if desired.

Four brake elements 46, 47, 48 and 49 are arranged in pairs between the abutments. The brake members 46 and 49 engage the combined operating means and abutment 45 at the top of the support, and are free of the operating means and abutment at the bottom of the support, while the brake members 47 and 48 engage the operating means and abutment at the bottom of the support and are free of the operating means and abutment at the top of the support. Each of the brake members is formed, as shown in Figures 2 and 3, of L section to include arcuate shoe portions for engagement with the web of the drum, and flat disc portions for engagement with the flanges of the drum.

To disengage the brake members from the drum, return spring devices 51 may be provided between the adjacent ends of the brake members, and additional return spring devices 52 may be arranged axially between the brake members of the pairs to move them axially together. The return devices 51 as shown are constructed the same as the units 42 and 52. Each of the return spring devices 52 comprises a cylinder 53 connected to one of the brake members and a plunger 54 slidable in the cylinder and connected to the opposite brake member. A spring 55 urges the plunger 54 into the cylinder and movement is limited by a collar 56 fitting slidably in the cylinder with a tight friction fit and having limited lost motion relative to the plunger 54 due to spaced collars 57 thereon. In normal brake application, axial separation of the brake members merely takes up the clearance between the collars 57 and the collar 56 so that the collar 56 is not used. As the friction facings wear, additional movement will be required, and the collar 56 will be slid in the cylinder 53 to readjust the axial position of the brakes automatically, the spring 55 having insufficient strength to move the collar 56.

The brake members are spread axially by cam elements 58 between adjacent brake members, and which may be identical to the cam elements 26 of Figures 1 to 4 to function in the same manner.

To apply the brake of Figures 7 and 8, the cylinders 45 are energized and will spread the adjacent brake members radially into engagement with the drum. Assuming a counter-clockwise rotation of the drum, the brake members 46 and 48 will be moved counter-clockwise by the combined operating means and abutments 45, and will move relative to the brake members 47 and 49. The cams 52 will cause the brake members to spread axially into engagement with the flanges of the drum, so that the arcuate shoe surfaces and the flat disc surfaces of the brake members will be simultaneously effective to brake the drum.

In the embodiment of Figures 9 and 10 a fixed support 61 is provided which carries at one side a fixed abutment member 62 and diametrically opposite thereto rotatably carries a cam 63. The cam 63 may be turned by an operating lever 64 and may function both as a fixed adjustable abutment and as a mechanical applying means for applying the brake mechanically when desired.

This brake includes three brake members 65, 66 and 67. The brake members 65 and 66 are identical, being arcuate members of L section with arcuate lining surfaces 68 and flat disc linings 69 to engage one flange of the drum. The brake member 67 is in the form of a flat annular disc carrying a friction lining 71 to engage the opposite flange of the drum and lies adjacent to the open end of the L section brake members 65 and 66.

The brake members 65 and 66 lie between the abutments 62 and 63 as shown in Figure 9, so that circumferential movement thereof relative to the support will be limited by the abutments 62 and 63. Return spring devices 72 which are preferably the same as the spring devices 42, 51 and 52 may be provided connecting the ends of the brake members 62 and 66 to move them inward from the drum. Cam elements 73 which may be identical to the cam elements 26 of Figures 1 to 4 extend between the disc portions of the brake members 65 and 66 and the brake member 67 to separate them axially.

To apply the brake hydraulically, two or more hydraulic motor units 74 are provided, acting axially between the brake members 65 and 66 and the flat disc member 67. As shown in Figure 10, the motor units 74 comprise cylinders secured to the disc portions of the brake members 65 and 66 and carrying pistons 75 which loosely engage the disc brake member 67.

For a normal application of the brake of Figures 9 and 10, the motors 74 are energized to separate the brake members axially, thereby moving the friction surfaces 69 and 71 thereof into engagement with the flanges of the drum. The brake member 67 tends to rotate with the drum at this time and tilts the cam elements 73 to move the brake members 65 and 66 axially into engagement with the drum with an additional applying force. Preferably, relative circumferential movement between brake member 67 and the brake members 65 and 66 is limited by lugs 76 secured to the brake member 67 and engageable with the ends of the brake members 65 and 66 to urge them circumferentially. The circumferential forces produced by the cam elements 73 and additionally by the lugs 76, will tend to move the brake members 65 and 66 radially outward into engagement with the drum so that all of the braking surfaces are simultaneously effective.

Alternatively, the brake of Figures 9 and 10 may be applied by turning the lever 64 to turn the cam 63, thereby to separate the brake members 65 and 66 radially into engagement with the web of the drum. The initial circumferential movement of the brake members 65 and 66 will turn the cam elements 73 to spread the several brake members axially into engagement with the flange of the drum, and the friction drag on the brake member 67 will tend to cause it to turn relative to the brake members 65 and 66 to tilt the cam elements further and apply the brake members with a servo action. Thus in either method of applying the brake of Figures 9 and 10, all of the braking surfaces are simultaneously effective. The cam 63 as mentioned above may also be adjusted to adjust the clearance between the arcuate shoe surfaces 68 of the braking members 65 and 66 and the web of the drum.

While several embodiments of the invention have been shown and described in detail, it will be understood that these are illustrative only and are not to be taken as a definition of the scope of the invention, reference being had for this purpose to the appended claims.

What is claimed is:

1. A combined shoe and disc brake comprising an annular drum of channel section with the channel opening inwardly, a stationary support adjacent to the drum, a pair of brake members carried by the support in side-by-side relationship within the drum and each including an arcuate shoe portion movable radially into engagement with the web of the drum and a flat disc portion movable axially into engagement with the flanges of the drum, abutment means on the support to limit turning of one of the brake members with the drum, operating means acting tangentially on the end of the other brake member to urge said other brake member radially outward into engagement with the web of the drum, and a series of tiltable cam elements extending axially between the brake members and having continuous smoothly curved ends eccentric to each other engaging the disc portions of the brake members to spread them axially into engagement with the flanges of the drum upon relative circumferential movement of the brake members in one direction.

2. The brake of claim 1 in which the disc portions of the brake members are formed with openings therein and the cam elements are formed with projecting lugs at their ends fitting into the openings to support the cam elements and to prevent slipping thereof relative to the brake members.

3. A combined shoe and disc brake comprising an annular drum of channel section with the channel opening inwardly, a stationary support adjacent to the drum, a plurality of side by side pairs of brake members within the drum, each pair including two disc portions movable axially into engagement with the flanges of the drum and at least one shoe portion movable radially into engagement with the web of the drum, an abutment on the support engageable with one brake member of one pair to limit rotation thereof, operating means to move one brake member of another pair into engagement with the drum, cam means interconnecting the brake members of each pair to urge them away from each other into engagement with the drum on relative circumferential movement thereof, and a flexible connection between the other brake members of the pairs to transmit circumferential forces therebetween.

4. The construction of claim 3 in which the operating means comprises radially movable elements underlying all of the brake elements to urge them radially outward into engagement with the web of the drum.

5. The construction of claim 3 in which the cam means comprises tiltable cam elements extending axially between the disc portions of the brake members and having eccentrically curved ends.

6. A combined shoe and disc brake comprising an annular drum of channel section with the channel opening inwardly, a stationary support adjacent to the drum, a plurality of side by side pairs of brake members within the drum, each pair including two disc portions movable axially into engagement with the flanges of the drum and at least one shoe portion movable radially into engagement with the web of the drum, an abutment on the support engageable with one brake member of one pair to limit rotation thereof, a circumferentially expansible operator carried by the support and engaging one brake member of another pair to move it radially into engagement with the drum, a flexible connection between the other brake members of the pairs to transmit circumferential forces therebetween, and cam means interconnecting the brake members of the pairs to urge them axially apart into engagement with the flanges of the drum on relative circumferential movement thereof.

7. The brake of claim 6 in which the cam means between the different pairs of brake members are formed with different cam angles.

8. A combined shoe and disc brake comprising an annular drum of channel section with the channel opening inwardly, a stationary support adjacent to the drum, a plurality of spaced abutments carried by the support within the drum, a pair of brake members in side by side relationship between adjacent abutments, at least one of which includes an arcuate shoe portion to engage the web of the drum, and both of which include flat disc portions to engage the flanges of the drum respectively, one end of one brake member of each pair engaging one abutment and the opposite end of the other brake member engaging the other abutment, cam means interconnecting the brake members to urge them apart and into engagement with the drum upon relative circumferential movement thereof, and operating means in at least one of the abutments to urge the end of the adjacent brake member circumferentially to spread it into engagement with the drum, the cam means comprising tiltable cam elements extending axially between the disc portions of the brake members and having continuous smoothly curved ends eccentric to each other engaging the disc portions of the brake members.

9. A combined shoe and disc brake comprising an annular drum of channel section with the channel opening inwardly, a stationary support adjacent to the drum, a plurality of spaced abutments carried by the support within the drum, a pair of brake members in side by side relationship between adjacent abutments, at least one of which includes an arcuate shoe portion to engage the web of the drum, and both of which include flat disc portions to engage the flanges of the drum respectively, one brake member of each pair engaging one abutment and the other brake member engaging the other abutment, a series of tiltable cam elements extending axially between the brake members and having continuous smoothly curved ends eccentric to each other engaging the disc portions of the brake members to spread them axially into engagement with the flanges of the drum upon relative circumferential movement of the brake members in one direction, and operating means in each of the abutments to urge the adjacent brake members circumferentially.

10. A combined shoe and disc brake comprising an annular drum of channel section with the channel opening inwardly, a stationary support adjacent to the drum, a pair of brake members carried by the support in side-by-side relationship within the drum, each of the brake members including flat disc portions engageable respectively with the sides of the drum and at least one of the brake members having an arcuate shoe portion engageable with the web of the drum, abutment means on the support to limit turning of one of the brake members with the drum, operating means engageable with the end of the other brake member to urge it tangentially thereby to move the brake members radially outward to move the arcuate shoe portion into engagement with the web of the drum, and a series of tiltable cam elements extending axially between the brake members and having continuous smoothly curved ends eccentric to each other engaging the disc portions of the brake members to spread them axially into engagement with the flanges of the drum upon relative circumferential movement of the brake members in one direction.

11. The brake of claim 10 in which one of the brake members comprises a flat disc portion only and the other is of L section with a flat disc portion defined by one flange and an arcuate shoe portion defined by the other flange.

12. The brake of claim 10 including second operating means between the brake members to urge them axially apart into engagement with the sides of the drum.

References Cited in the file of this patent

UNITED STATES PATENTS

| | | |
|---|---|---|
| 1,982,798 | Dodge | Dec. 4, 1934 |
| 2,086,538 | Dabney | July 13, 1937 |
| 2,206,742 | Dodge | July 2, 1940 |
| 2,256,725 | Pierce et al. | Sept. 23, 1941 |
| 2,371,503 | Carter | Mar. 13, 1945 |
| 2,595,859 | Lambert et al. | May 6, 1952 |
| 2,789,666 | Burnett | Apr. 23, 1957 |

FOREIGN PATENTS

| | | |
|---|---|---|
| 167,082 | Australia | Feb. 24, 1956 |
| 1,106,668 | France | Dec. 21, 1955 |